May 12, 1964  R. R. COLE  3,132,719
BALL NUT AND SCREW LUBRICATOR
Filed May 14, 1962
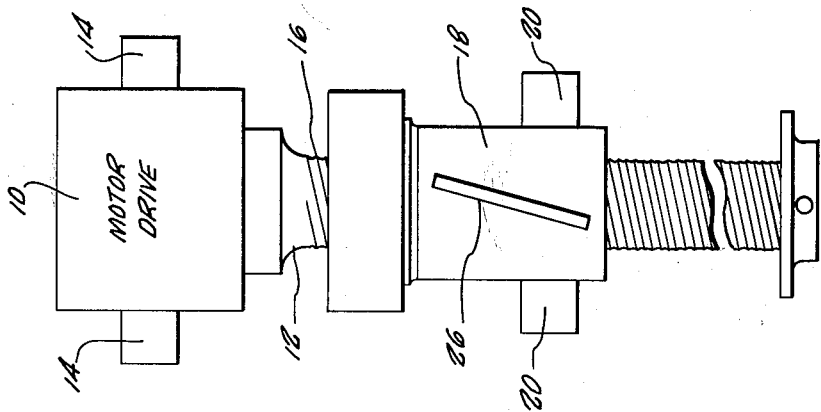
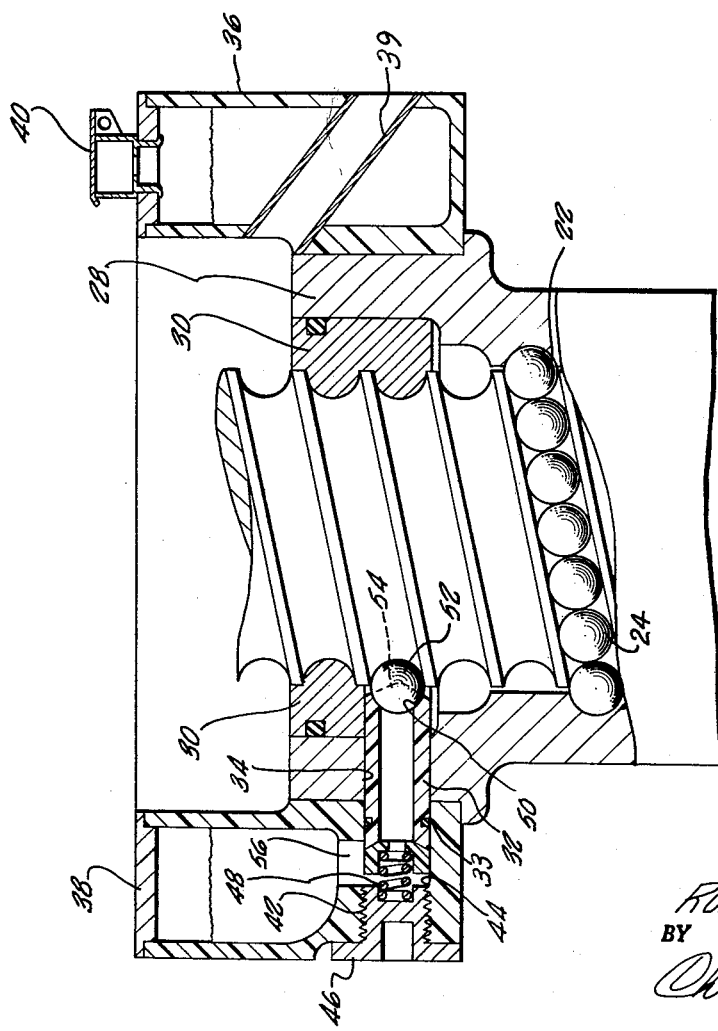
INVENTOR.
ROBERT R. COLE
BY
ATTORNEYS.

United States Patent Office 3,132,719
Patented May 12, 1964

3,132,719
BALL NUT AND SCREW LUBRICATOR
Robert R. Cole, Yorba Linda, Calif., assignor to Vard Division, Royal Industries, Pasadena, Calif., a corporation of California
Filed May 14, 1962, Ser. No. 194,621
5 Claims. (Cl. 184—65)

This invention relates to lubrication apparatus for a screw drive, and more particularly, is concerned with means for lubricating the screw in a ball nut and screw drive used for operating aircraft control surfaces and the like.

Ball nut and screw drives are well known in which the screw is threaded through a nut with ball bearings circulating between the nut and screw in cooperating helical grooves. The ball bearings greatly reduce the friction that otherwise exists between the sliding surfaces of the threads in the nut and engaging screw. Ball nut and screw drives of this type have been adapted to the operation of the control surfaces in jet aircraft where they are necessarily exposed to a wide range of ambient operating conditions. The use of a ball nut and screw drive for use in aircraft has provided a unique problem in providing lubrication and also protection against corrosion. Because of the high loading with minimum weight, materials that provide hardened parts are required. This means that the normal means of providing protection against rust and corrosion, such as painting, plating or using non-corrosion metals is not feasible.

In the past it has been the practice to have the maintenance crew which service the aircraft apply a coating of light oil to the screw as a routine maintenance measure. Heavier greases or similar materials having long lasting properties cannot be used because they clog up the operation of the recirculating balls in the ball nut. Metering devices using capillary tube or the like to continuously drip very light oils onto the screw have not been practical because of the wide range of temperature and pressure under which the device operates.

The present invention provides an improved lubricating arrangement for a ball nut and screw which applies a very light oil to the screw surface for lubricating the ball nut and protecting the screw against corrosion. The lubrication system can be completely sealed and is arranged to apply lubricant only when the screw is threading through the nut. In brief, the present invention provides a lubricating device for a ball nut and screw drive which comprises a hollow tube slideably supported by the nut and extending at right angles to the axis of rotation of the screw. Spring means carried by the nut engages the tube for urging the tube toward the screw. The end of the tube adjacent the screw is provided with a spherically formed surface providing a socket in which a ball is seated. The ball is positioned to engage the groove in the screw. The tube is provided with a pair of integral fingers which project on either side of the ball and extend partially around the ball for holding the ball in the socket. A lubricating fluid container is mounted on the nut and means is provided for directing fluid from the container to the tube where the rotation of the ball transfers fluid from the tube to the surface of the screw.

For a more complete understanding of the invention, reference should be made to the accompanying drawing, wherein:

FIGURE 1 is a plan view of the ball nut and screw drive assembly; and

FIGURE 2 is a partial sectional view showing the details of the lubricating arrangement of the present invention.

Referring to the drawings in detail, the ball nut and screw drive assembly is shown as including a conventional motor drive 10 which rotates a screw 12. Motor drive 10 may be pivotally anchored to the frame of the airplane (not shown) by means of lugs 14 or other conventional mounting means. The screw 12 is provided with a helical groove 16, which, as shown in FIGURE 2, is preferably rounded in cross-sectional shape.

Cooperating with the screw 12 is a nut 18 preferably having a pair of lugs 20 for pivotally connecting the nut to linkage (not shown) for actuating the particular aircraft control surface associated with the drive. The nut 18 is provided with a helical groove 22, also rounded in cross-sectional shape. The cooperating grooves 16 and 22 of the screw and nut receive a plurality of ball bearings 24. As the screw rotates in the nut, the balls provide a substantially frictionless engagement between the nut and screw. A tube 26 provides a recirculation path for the balls 24 between the two ends of the groove 22 in the nut 18. Ball nut and screw drives of the type described are well known in the art and further description thereof in the present application is not believed essential to the understanding of the invention.

In order to provide lubrication for the ball bearings 24 and also to provide a corrosion resistant coating on the surfaces of the grooves in the screw 12 and nut 18, a novel lubricating arrangement is provided in combination with the nut 18, as particularly shown in FIGURE 2. The upper end of the nut 18 is provided with a counterbored section 28 which receives an annular scraper 30, preferably made of aluminum, bronze, or other relatively soft material. The scraper 30 is arranged to engage the groove 16 in the screw 12 so as to continuously remove grit, ice and other foreign materials that accumulate on the surface of the exposed screw and which would otherwise clog and interfere with the operation of the ball bearings 24. The scraper 30 is notched out at one point on its inner edge to receive the lubricating feeder tube indicated at 32. The tube 32 extends through a hole 34 in the nut 18, the tube 32 being slidable in the hole 34 in a direction transverse to the axis of rotation of the screw 12. The tube is fluidly but slidably sealed to the nut by an O-ring gasket means 33 disposed circumferentially of the tube at a location on the tube spaced from lubricating ball 52 and opposite from the screw.

An annular-shaped container 36, preferably molded of a single piece of transparent plastic material, such as Plexiglas, is pressed on the end of the nut over the counter-bored section 28. The annular container 36 is provided with a sealed cover 38 having an oil cap 40 through which lubricating oil can be supplied to the container 36. A drain tube 39 extends downwardly and outwardly from the screw through container 36 from adjacent the scraper to exteriorly of the container and provides means for dumping moisture, sludge, ice and grit removed from the screw by the scraper.

The container 36 is provided with a solid portion 42 through which extends a hole 44 which is aligned with the hole 34 in the nut 18. The tube 32 is inserted in position through the hole 44 into the hole 34 and a threaded cap 46 is secured in the outer opening of the hole 44. A coil spring 48 extends between the cap 46 and the end of the tube 32 for normally urging the tube inwardly in the direction of the screw 16.

The inner end of the tube 32 is formed with a spherical surface 50 providing a socket for receiving a ball 52. The position of the tube 32 is such that the ball 52 seats in the groove 16 in the screw 12. The ball 52 is preferably retained in the socket in the end of the tube by extending portions of the tube 32 in the form of fingers 54 which project downwardly on either side of the ball into the space formed by the groove 16 in the screw 12. The ends of the fingers 54 are swaged over the ball to retain the ball in the socket. The ball preferably is made of a porous chromium with a pit-etched surface and preferably is of a diameter equal to bearing balls 24, as shown in FIG. 2.

The lubricating fluid in the container 36 communicates with the hollow tube 32 through an opening 56, the fluid normally flowing by gravity through the opening 56 in the container into the hollow center of the tube 32 and against the ball 52. Whenever the screw 12 is rotated by the motor drive 10, the ball 52 is caused to rotate and continuously transfer a small quantity of fluid from the inside of the tube 32 to the surface of the groove 16. Thus, the ball maintains a seal for the fluid container and provides a positive control of the rate of transfer of lubricating fluid onto the surface of the screw. This transfer rate is not materially affected by changes in the viscosity of the fluid. Furthermore, the ball 52 provides transfer of fluid only during the time when the screw 12 is being rotated, thus conserving fluid during periods when the control surfaces are not being operated.

I claim:

1. A lubricating device for a ball nut and screw drive in which bearing balls roll in cooperating helical semi-circularly contoured grooves in the screw and nut of diameter substantially equal to the diameter of the bearing balls and which define a helical bearing ball race, the device comprising a hollow tube slideably supported by the nut at a location spaced from the bearing balls and extending at right angles to the axis of rotation of the screw, the tube having a spherical surface formed at the end projecting toward the screw to provide a socket, a lubricating ball of diameter smaller than the outside diameter of the tube and larger than the inside diameter of the tube but of diameter equal to the diameter of the bearing balls, the ball being seated in the socket, the tube having a pair of lip portions projecting toward the screw on either end of the ball and extending partially around the ball for holding the ball in the socket, spring means carried by the nut and engaging the tube for urging the tube toward the screw and for urging the lubricating ball into engagement with the groove of the screw, whereby the ball at the end of the tube is pressed into engagement with the groove in the screw, a container mounted on the nut, and means providing a fluid passage between the container and the tube for directing fluid from the container to the inside of the tube.

2. A lubricating device for a ball nut and screw drive in which bearing balls roll in cooperating helical semi-circularly contoured grooves in the screw and nut, the device comprising a hollow tube slideably supported by the nut and extending at right angles to the axis of rotation of the screw to an end adjacent the screw, the tube having a spherical surface formed at the end adjacent the screw to provide a socket, a lubricating ball seated in the socket, spring means carried by the nut and engaging the tube for urging the tube toward the screw, whereby the lubricating ball is pressed into engagement with the groove in the screw around a portion of the circumference of the lubricating ball, a container mounted on the nut, and means providing a fluid passage between the container and the tube for directing lubricating fluid from the container to the inside of the tube.

3. A lubricating device for a ball nut and screw drive in which bearing balls roll in cooperating helical grooves in the screw and nut contoured to mate with the bearing balls, the device comprising a hollow tube slideably supported by the nut and extending at right angles to the axis of rotation of the screw to an end adjacent the screw, the tube having a spherical surface formed at the end adjacent the screw to provide a socket, a lubricating ball seated in the socket and mating with the groove in the screw, spring means carried by the nut and engaging the tube for urging the tube toward the screw, whereby the lubricating ball at the end of the tube is pressed into engagement with the groove in the screw and means for supplying lubricating fluid to the tube for transfer to the groove in the screw by rotation of the ball on rotation of the screw.

4. A lubricating device for a ball nut and screw drive in which bearing balls roll in cooperating helical semi-circularly contoured grooves in the screw and nut, the device comprising a hollow tube slideably supported by the nut, the tube having an end disposed adjacent the groove in the screw, the tube having a spherical surface formed at the end to provide a socket, a lubricating ball, means integral with the tube for movably securing the lubricating ball in the socket, spring means carried by the nut and engaging the tube for urging the tube toward the screw, whereby the lubricating ball at the end of the tube is pressed into engagement with the groove in the screw around a portion of the circumference of the lubricating ball, and means for supplying lubricating fluid through the tube to the lubricating ball.

5. In an aircraft having movable control members, a ball nut adapted to be connected to at least one of the control members, a rotatable drive screw engaged with the ball nut, the ball nut and the screw having cooperating helical semi-circularly contoured grooves therein, and a plurality of bearing balls disposed in the cooperating grooves and permitting axial movement of the screw relative to the nut only upon rotation of the screw relative to the nut, improved means for lubricating the screw comprising a lubricant container mounted to the nut, a hollow cylindrical tube having fluid flow communication to the container slidably disposed in the nut, at a location spaced from the bearing balls and extending to an end adjacent the groove in the screw, a spherical seat formed in the end of the tube and opening toward the groove in the screw, a lubricating ball disposed in the seat, the lubricating ball having a diameter less than the outer diameter of the tube but greater than the inner diameter of the tube and substantially equal to the diameter of the contour of the groove in the screw, means integral with the tube for movably securing the lubricating ball in the seat across the inner diameter of the tube, resilient means biased against the tube for urging the lubricating ball into engagement with the groove in the screw, means for fluidly but slidably sealing the exterior of the tube to the nut, and lubricating fluid in the container, rotation of the screw relative to the nut rotating the ball and transferring a film of lubricating fluid from the tube to the groove in the screw.

References Cited in the file of this patent

UNITED STATES PATENTS

| 1,235,812 | Kelly | Aug. 7, 1917 |
| 1,788,072 | Wilkes | Jan. 6, 1931 |
| 1,937,949 | Flather et al. | Dec. 5, 1933 |
| 2,629,605 | Krisch | Feb. 24, 1953 |

FOREIGN PATENTS

| 559,407 | Great Britain | Feb. 17, 1944 |